US009979438B2

(12) United States Patent
Belk et al.

(10) Patent No.: US 9,979,438 B2
(45) Date of Patent: May 22, 2018

(54) CONTROLLING A MEDIA DEVICE USING A MOBILE DEVICE

(71) Applicant: Apple Inc., Cupertino, CA (US)

(72) Inventors: Andy Belk, Portola Valley, CA (US); Augustin Prats, San Francisco, CA (US); Joakim Linde, Palo Alto, CA (US); Lucas Newman, San Francisco, CA (US); Nicholas J. Paulson, Cupertino, CA (US); Thomas Matthieu Alsina, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 13/913,172

(22) Filed: Jun. 7, 2013

(65) Prior Publication Data
US 2014/0364056 A1 Dec. 11, 2014

(51) Int. Cl.
H04W 4/00 (2018.01)
H04W 12/06 (2009.01)
(Continued)

(52) U.S. Cl.
CPC ....... *H04B 5/0031* (2013.01); *H04N 21/4126* (2013.01); *H04N 21/4367* (2013.01);
(Continued)

(58) Field of Classification Search
CPC ....... H04N 21/41407; H04N 21/43615; H04N 21/4126; H04N 21/43637;
(Continued)

(56) References Cited

U.S. PATENT DOCUMENTS

2003/0212802 A1 11/2003 Rector et al.
2006/0123081 A1 6/2006 Baudino
(Continued)

FOREIGN PATENT DOCUMENTS

CN 101115000 A 1/2008
CN 101132363 A 2/2008
(Continued)

OTHER PUBLICATIONS

Anonymous: "Apple TV (3rd generation): Using an iOS device to set up your Apple TV", Sep. 24, 2013 (Sep. 24, 2013), XP055133108, Retrieved from the Internet: URL:http://support.apple.com/kb/HT590O [retrieved on Aug. 4, 2014].
(Continued)

*Primary Examiner* — Philip Sobutka
(74) *Attorney, Agent, or Firm* — Dickinson Wright RLLP

(57) ABSTRACT

Techniques for automatically configuring and controlling a digital media device are described. A digital media device can be configured or controlled by a mobile device, e.g., a smart mobile phone. When the digital media device is being configured, the digital media device can broadcast a signal, indicating that the digital media device is requesting configuration information from a mobile device. A mobile device located in proximity of the digital media device, upon detecting the signal, can perform various security checks to determine that the request is legitimate, and then open a communication channel with the digital media device. The mobile device can provide user preferences of the mobile device, as well as credentials for accessing and downloading remote content, to the digital media device through the communication channel. Upon receiving the configuration information, the digital media device can use parameters in the configuration information as its settings.

30 Claims, 11 Drawing Sheets

(51) Int. Cl.
    *H04B 5/00*     (2006.01)
    *H04N 21/41*     (2011.01)
    *H04N 21/4367*     (2011.01)
    *H04N 21/441*     (2011.01)
    *H04N 21/442*     (2011.01)
    *H04N 21/475*     (2011.01)
    *H04N 21/6547*     (2011.01)
    *H04W 4/02*     (2018.01)
    *H04W 12/08*     (2009.01)

(52) U.S. Cl.
    CPC ..... *H04N 21/441* (2013.01); *H04N 21/44218* (2013.01); *H04N 21/4753* (2013.01); *H04N 21/6547* (2013.01); *H04W 4/00* (2013.01); *H04W 4/021* (2013.01); *H04W 12/06* (2013.01); *H04W 12/08* (2013.01)

(58) Field of Classification Search
    CPC ... H04N 21/25875; H04L 63/08; H04L 63/10; H04L 67/306; H04W 12/06; H04W 4/008; H04W 12/08; H04W 4/023; H04W 4/001; H04W 4/021; H04W 8/24; H04W 4/025
    USPC ........... 455/41.1, 41.2, 411, 414.1, 419, 420, 455/456.3; 725/37
    See application file for complete search history.

(56) References Cited

U.S. PATENT DOCUMENTS

| | | | |
|---|---|---|---|
| 2006/0250980 A1 | 11/2006 | Pereira et al. | |
| 2007/0268911 A1* | 11/2007 | Alve | H04L 63/0492 370/395.52 |
| 2008/0175187 A1* | 7/2008 | Lowry | H04L 67/125 370/328 |
| 2010/0306394 A1* | 12/2010 | Brown | H04L 63/0492 709/229 |
| 2011/0085526 A1 | 4/2011 | Joseph et al. | |
| 2011/0188657 A1 | 8/2011 | Kweon et al. | |
| 2011/0302282 A1 | 12/2011 | Dadlani et al. | |
| 2011/0319016 A1* | 12/2011 | Gormley | H04B 5/0012 455/41.1 |
| 2013/0014232 A1 | 1/2013 | Louboutin et al. | |
| 2013/0023339 A1* | 1/2013 | Davis | G07F 17/3206 463/29 |
| 2013/0116964 A1 | 5/2013 | Van Roermund et al. | |

FOREIGN PATENT DOCUMENTS

| | | |
|---|---|---|
| EP | 1 802 033 | 6/2007 |
| EP | 1802033 A1 | 6/2007 |
| WO | WO 2011/146059 | 11/2011 |

OTHER PUBLICATIONS

"Bluetooth Proximity Profile", Bluetooth SIG web site. Jun. 21, 2011 (Jun. 21, 2011), XP055118502, Retrieved from the Internet: URL: https://www.bluetooth.org/en-us/specification/adopted-specifications [retrieved -on. May 16, 2014].

International Search Report and Written Opinion of the International Searching Authority, PCT Application Serial No. PCT/US2014/040054, dated Oct. 24, 2014, 19 pp.

Taiwan Office Action in Application No. 103118135, dated Feb. 22, 2016, 12 pages.

Korean Intellectual Property Office Notice of Preliminary Rejection for Application No. 10-2015-7034960, dated Dec. 27, 2016, 13 pages (With English Translation).

Chinese Patent Application No. 201480032002.7—First Office Action dated Dec. 28, 2017.

* cited by examiner

CONTROLLING A MEDIA DEVICE USING A MOBILE DEVICE

TECHNICAL FIELD

This disclosure relates generally to media device management.

BACKGROUND

Many electronic devices can function as media devices (e.g., digital media receivers or DMRs) suitable for receiving digital media content from a communications network and providing the digital media content for presentation to a user. For example, a home entertainment system often includes a DMR configured to download digital multimedia content including pictures, music, or video from remote media services and to provide the digital multimedia content for play on an audio system or a television. The DMR often requires complex configurations to function properly. For example, to start downloading or playing content, the DMR is often connected to a wireless network that requires a password to access, and to a media service that requires a user name and password. In addition, the configurations can include user preferences, e.g., a language setting, a time zone setting, or a display setting. A hardware keyboard or a remote control can be used to enter or change the settings of the DMR. Alternatively, a DMR can provide for display a virtual keyboard, and allow a user to navigate the virtual keyboard using up, down, left, and right buttons on a remote control to enter the settings one letter at a time.

SUMMARY

Techniques for automatically configuring and controlling a digital media device are described. A digital media device can be configured or controlled by a mobile device, e.g., a smart mobile phone. When the digital media device is being configured, the digital media device can broadcast a signal, indicating that the digital media device is requesting configuration information from a mobile device. A mobile device located in proximity of the digital media device, upon detecting the signal, can perform various security checks to authenticate the request, and then open a communication channel with the digital media device. The mobile device can provide user preferences of the mobile device, as well as credentials for accessing and downloading remote content, to the digital media device through the communication channel. Upon receiving the configuration information, the digital media device can use parameters in the configuration information as its settings.

The features described in this specification can be implemented to achieve the following advantages. Compared to conventional ways of configuring a digital media device, automatic device configuration can be more user friendly. The configuration procedure is simplified. The techniques described in this specification can reduce or remove the need for manually entering network access passwords, which are often long and difficult to remember. In addition, user preferences and subscribed services can be ported from one digital media device to another using a mobile device, without requiring a user to re-enter the preferences and re-login to the subscribed services.

Control of a digital media device can be enhanced. A conventional media device often has a simple remote control. Accessing various features of the digital media device can require navigation through multiple layers of menus. The techniques described in this specification can allow a mobile device to function as a full-featured remote control of the media device, such that multiple virtual control switches, buttons, or dials can be displayed on a surface (e.g., a screen) of the mobile device, giving a user direct access to multiple functions by touching the surface, by performing a motion gesture using the device, or by voice input.

The techniques described in this specification can allow context-sensitive control of a media device. A conventional remote control of a media device typically has fixed buttons, where all the buttons are physically located on the remote control. A mobile device having a programmable surface can display virtual buttons based on a context, including presenting some virtual buttons in one given context (e.g., movie browser navigation buttons when browsing for movies) and other virtual buttons in another context (e.g., play/pause and volume control buttons when playing movies).

The techniques described in this specification can allow multiple media devices to be synchronized to have the same configuration. For example, movie or music channels can be selected on a first media device. A mobile device can transport the selected channels to a second media device, such that the user need not select those channels again on the second media device.

The details of one or more implementations of automatically configuring and controlling a digital media device using a mobile device are set forth in the accompanying drawings and the description below. Other features, aspects, and advantages of automatically configuring and controlling a media device using a mobile device will become apparent from the description, the drawings, and the claims.

BRIEF DESCRIPTION OF THE DRAWINGS

Like reference symbols in the various drawings indicate like elements.

DETAILED DESCRIPTION

Exemplary Device Configuration

Figure 1:
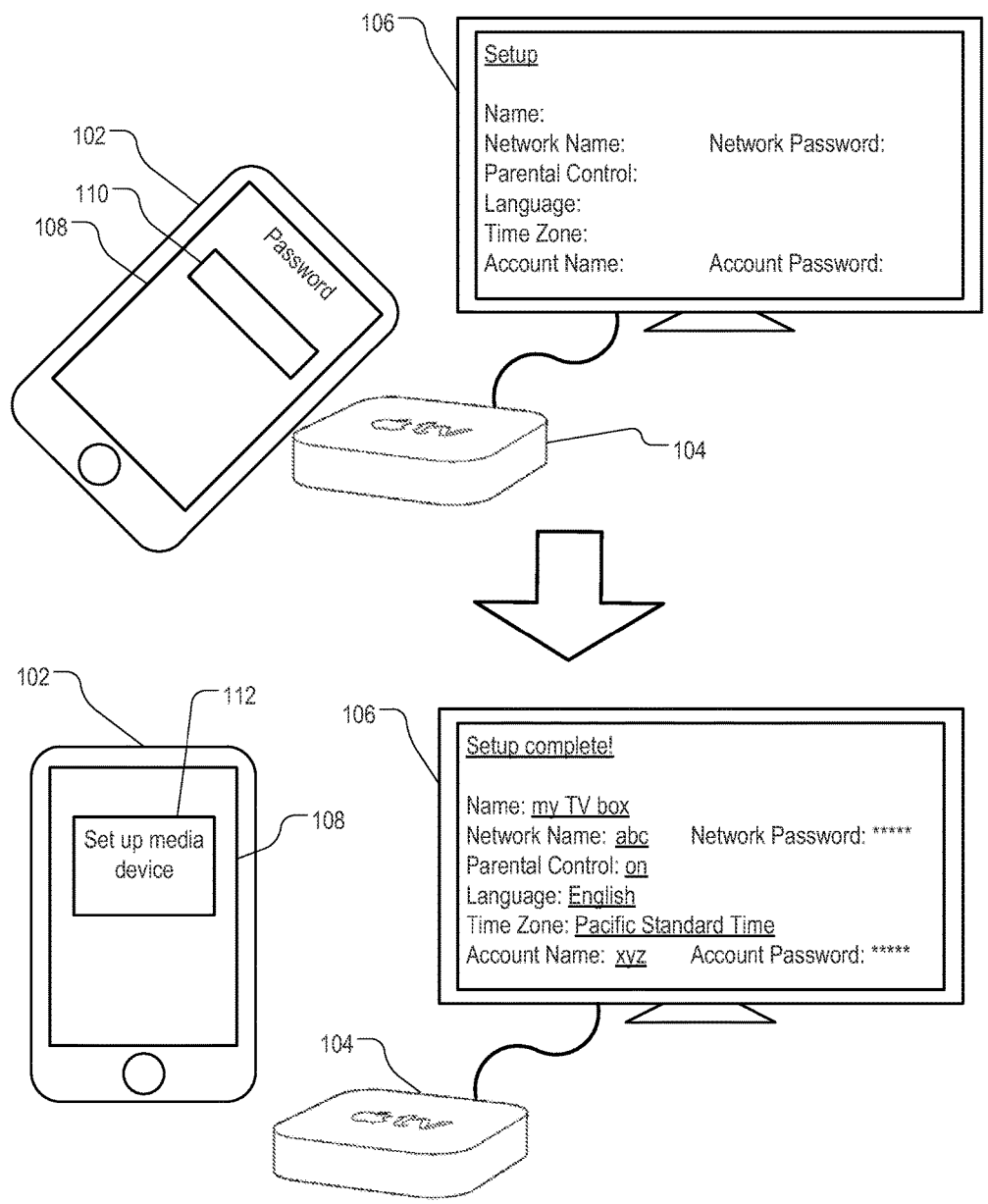
FIG. 1 is a diagram illustrating an exemplary implementation of automatically configuring a digital media device using a mobile device.

FIG. 1 is a diagram illustrating an exemplary implementation of automatically configuring a digital media device using a mobile device. Mobile device 102 can be an exemplary electronic device programmed to configure digital media device 104. Digital media device 104 can be an electronic device programmed to download or play multimedia content including pictures, audio, or video. For example, digital media device 104 can be a DMR, a digital audio or video player, a mobile or stationary computing device, a digital camera, an Internet-enabled television, or a game console. Digital media device 104 can include or be coupled to display device 106. Display device 106 can be a television. Digital media device 104 can be a device that has not been previously configured. For example, digital media device 104 can be removed from packaging and powered up the first time. Upon powering up, digital media device 104 can provide a configuration user interface for display on display device 106. The configuration user interface can include parameters that require user input to setup.

Mobile device 102, when located in proximity to digital media device 104, can provide values of the parameters to digital media device 104. Mobile device 102 can be located in proximity to digital media device 104 when mobile device 102 is located within a proximity threshold distance from digital media device 104. The proximity threshold distance can be a pre-determined distance that is much less than (e.g., less than ten percent of) a communication range of mobile device 102 and digital media device 104. For example, when mobile device 102 and digital media device 104 can communicate wirelessly over a distance of ten to twenty meters, the proximity threshold distance can be half a meter (or one to two feet). In some implementations, the proximity threshold distance can be expressed in a signal strength measurement (e.g., above X dB).

Mobile device 102 can determine that mobile device 102 is located within the proximity threshold distance to digital media device 104. Mobile device 102 can make the determination using various location technologies. The determination can trigger mobile device 102 to configure digital media device 104 automatically. In some implementations, to trigger mobile device 102 to configure digital media device 104 automatically, a confirmation event can be utilized. The confirmation event can include an action that confirms that mobile device 102 is not located close to digital media device 104 by accident but is intended to configure digital media device 104. In various implementations, mobile device 102 can be programmed to detect various confirmation events. For example, mobile device 102 can be programmed to trigger configuration of digital media device 104 after mobile device 102 taps digital media device 104 or taps an object located within the proximity threshold distance to digital media device 104.

The automatic configuration can include a security check. For example, upon the determination, mobile device 102 can turn on display surface 108 (if display surface 108 was not already turned on) and display security user interface item 110. Security user interface item 110 can be a textual or graphic item requesting a user to enter a password to unlock mobile device 102 before mobile device 102 provides information to digital media device 104.

After passing the security check, mobile device 102 can provide for display set up user interface item 112. Set up user interface item 112 can be a virtual button programmed to receive a touch input that can trigger transmission of configuration information from mobile device 102 to digital media device 104. The configuration information can include multiple parameters for configuring a device. The parameters can include, for example, a name of a wireless network, a password to access that wireless network, a locality setting that specifies a preferred language, a time zone setting, a display setting specifying a preferred display format (e.g., a 12-hour or a 24-hour time-display format) and other parameters. The configuration information can also include credentials for accessing an online store or a content provider. Mobile device 102 can automatically gather the configuration information from existing settings of mobile device 102, or request a portion of the configuration information from a server.

After mobile device 102 transmits the configuration information to digital media device 104, digital media device 104 can assign parameter values in the configuration information to corresponding parameters of digital media device 104. Digital media device 104 can provide the parameters and corresponding values for display on display device 106. The parameters, which conventionally would require manual entry by a user using a remote control or a keyboard, are now automatically configured by mobile device 102.

In some implementations, mobile device 102 can simultaneously configure multiple digital media devices. Mobile device 102 can detect the digital media devices and determine that each of the digital media devices is located with a proximity threshold distance of mobile device 102. Mobile device 102 can make the determination based on a personal area network (PAN) signal broadcast by each of the digital media devices. The determination can trigger mobile device 102 to configure the digital media devices simultaneously.

Additionally or alternatively, mobile device 102 can detect digital media device 104 and determine that digital media device 104 is located within a proximity threshold distance of mobile device 102. Mobile device 102 can identify a network (e.g., a wireless local area network (WLAN)) to which digital media device 104 is connected. Mobile device 102 can then detect multiple digital media devices connected to the WLAN. Mobile device 102 can simultaneously configure the digital media devices, including devices located more than the proximity threshold distance away from mobile device 102. Mobile device 102 can configure these digital media devices wirelessly through the WLAN.

In some implementations, mobile device 102 can provide for display a list of detected digital media devices, receive a selection of one or more detected digital media devices from a user or a program. Mobile device 102 can then automatically and simultaneously configure the selected digital media devices.

Some advantages of configuring multiple media device through the WLAN are that multiple media devices (e.g., those in a school or at a business) can be configured simultaneously according to a same specification. In addition, the configuration through radio frequency (RF) signals through WLAN or PAN can be omnidirectional, avoiding some draw backs of configuration by conventional infra-red remote controls. For example, the media devices need not be in a line of sight in an infra-red cone of mobile device 102.

Exemplary Device Interactions

Figure 2A:
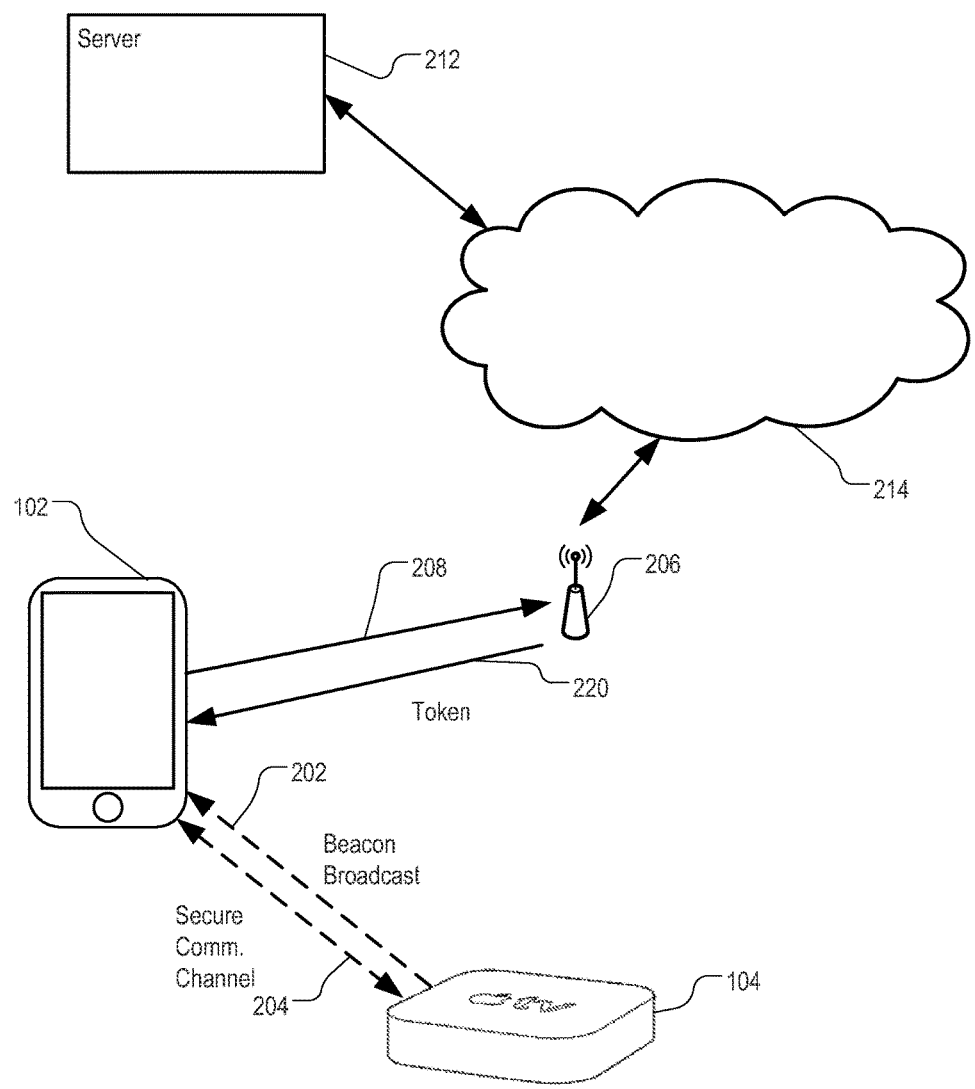
FIGS. 2A and 2B are diagrams illustrating exemplary interactions between a mobile device and a digital media device.

FIG. 2A is a diagram illustrating exemplary interactions between a mobile device and a media device being controlled by the mobile device. The mobile device and media device can be mobile device 102 and digital media device 104 of FIG. 1, respectively.

Digital media device 104, when initially powered up, during a reset, or upon another event that triggers a configuration of the device, can broadcast beacon signal 202. Beacon signal 202 can indicate that digital media device 104 requests configuration information. Digital media device 104 can broadcast beacon signal 202 using a wireless transmission protocol suitable for short-range communications in a PAN. For example, digital media device 104 can broadcast beacon signal 202 using Bluetooth™ technology. Beacon signal 202 can include a payload indicating a type or model of digital media device 104. The payload can include an identifier of digital media device 104.

Mobile device 102, upon receiving beacon signal 202, can determine whether to configure digital media device 104. The determination can be based on a distance between mobile device 102 and digital media device 104. In some implementations, mobile device 102 can determine the distance using a received signal strength indicator (RSSI) computed based on strength of beacon signal 202. If the distance satisfies a proximity threshold distance, mobile device 102 can provide various user interface items (including graphical or audio user interface items) for configuring digital media device 104.

In some implementations, when the distance satisfies the proximity threshold distance, mobile device 102 can use a confirmation event to trigger the automatic configuration. In various implementations, the confirmation event can be a tapping of mobile device 102 on digital media device 104 or any object located within the threshold distance to digital media device 104. The confirmation event can be mobile device 102 detecting a motion gesture of mobile device 102. The confirmation event can be mobile device 102 detecting an audio input, e.g., a whistle sound or a speech command. Upon detecting the confirmation event, mobile device 102 can present the user interface items to indicate to a user that it is now possible to configure digital media device 104.

The user interface items can include a prompt to a user for receiving a password. The password can be a password for unlocking mobile device 102 or a password for accessing a web-based service (e.g., an online application store). If mobile device 102 receives a valid password, mobile device 102 can create secure communication channel 204 between mobile device 102 and digital media device 104. Secure communication channel 204 can be created using a same or different wireless transmission protocol as the protocol used by digital media device 104 to broadcast beacon signal 202. Mobile device 102 can send, through secure communication channel 204, configuration information to digital media device 104. Upon receiving the configuration information, digital media device 104 can present a visual or audio setup menu, in which parameter values are already populated.

The configuration information can include a name and a password to access a WLAN of wireless access gateway 206. Wireless access gateway 206 can be a Wi-Fi™ or WiMAX™ access point. Communications between devices and wireless access gateway 206 can use a protocol (e.g., under Institute of Electrical and Electronics Engineers (IEEE) 802.11 or IEEE 802.16 standard) that is same as or different from a protocol for communications between mobile device 102 and digital media device 104.

In some implementations, mobile device 102 can send request 208 to server 212 through wireless access gateway 206 and communications network 214. Communications network 214 can be a local area network (LAN) or wide area network (WAN). Request 208 can include credentials, e.g., an account name and a password, for accessing services hosted on server 212. In addition, request 208 can include an identifier of digital media device 104. Server 212 can authenticate the password and provide, as a response to request 208, token 220 to mobile device 102. Token 220 can include a cryptographically secure code derived from an identifier of digital media device 104 and other cryptographic mechanisms such that token 220 is only valid for the specific instance of digital media device 104. In some implementations, token 220 can be associated with an expiration date, and is valid only before the expiration date In some implementations, token 220 can be associated with an expiration time (e.g., 30 minutes) from issuance, and is valid only before the expiration time has passed.

Mobile device 102, upon receiving token 220, can send token 220 to digital media device 104 through secure communication channel 204. Digital media device 104 can send token 220 to server 212 when digital media device 104 requires authentication (e.g., to purchase a movie).

Figure 2B:
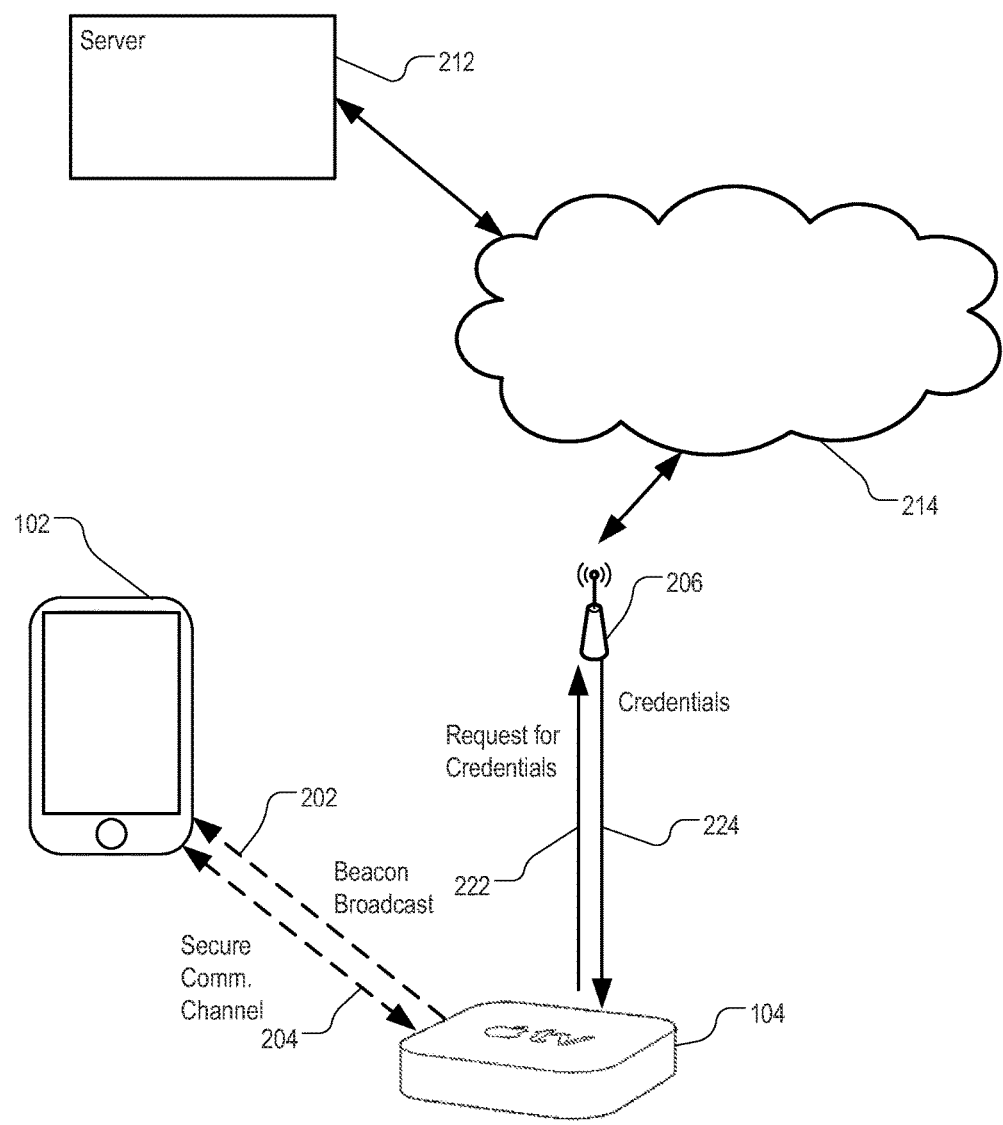

FIG. 2B is a diagram illustrating exemplary interactions between a mobile device and a media device being controlled by the mobile device. The mobile device and media device can be mobile device 102 and digital media device 104 of FIG. 1, respectively. In some implementations, during configuration, mobile device 102 can send, to digital media device 104 through secure communication channel 204, credentials for accessing a certification service of server 212. The credentials can include a user name and password, or token 220 received from server 212.

The certification service can store credentials to access multiple online services. For example, the certification service can store credentials for accessing an online shop, subscribed content, a mail server, or a document storage service. In some implementations, the credentials to access multiple online services stored by the certification service can be synchronized with mobile device 102 and can include all accounts and passwords know to mobile device 102. In some implementations, the credentials to access multiple online services stored by the certification service can be uploaded by mobile device 102 when mobile device 102 configures digital media device 104.

Upon receiving the credentials from mobile device 102, digital media device 104 can send request 222 to server 212 for a virtual package from the certification service. Request 222 can include the credentials received from mobile device 102. In response, server 212 can return virtual package 224, which can include the credentials to access all online services subscribed by a user of mobile device 102. Upon receiving virtual package 224, digital media device 104 can set up access to each of these online services using information contained in the virtual package.

Exemplary Device Components

Figure 3:
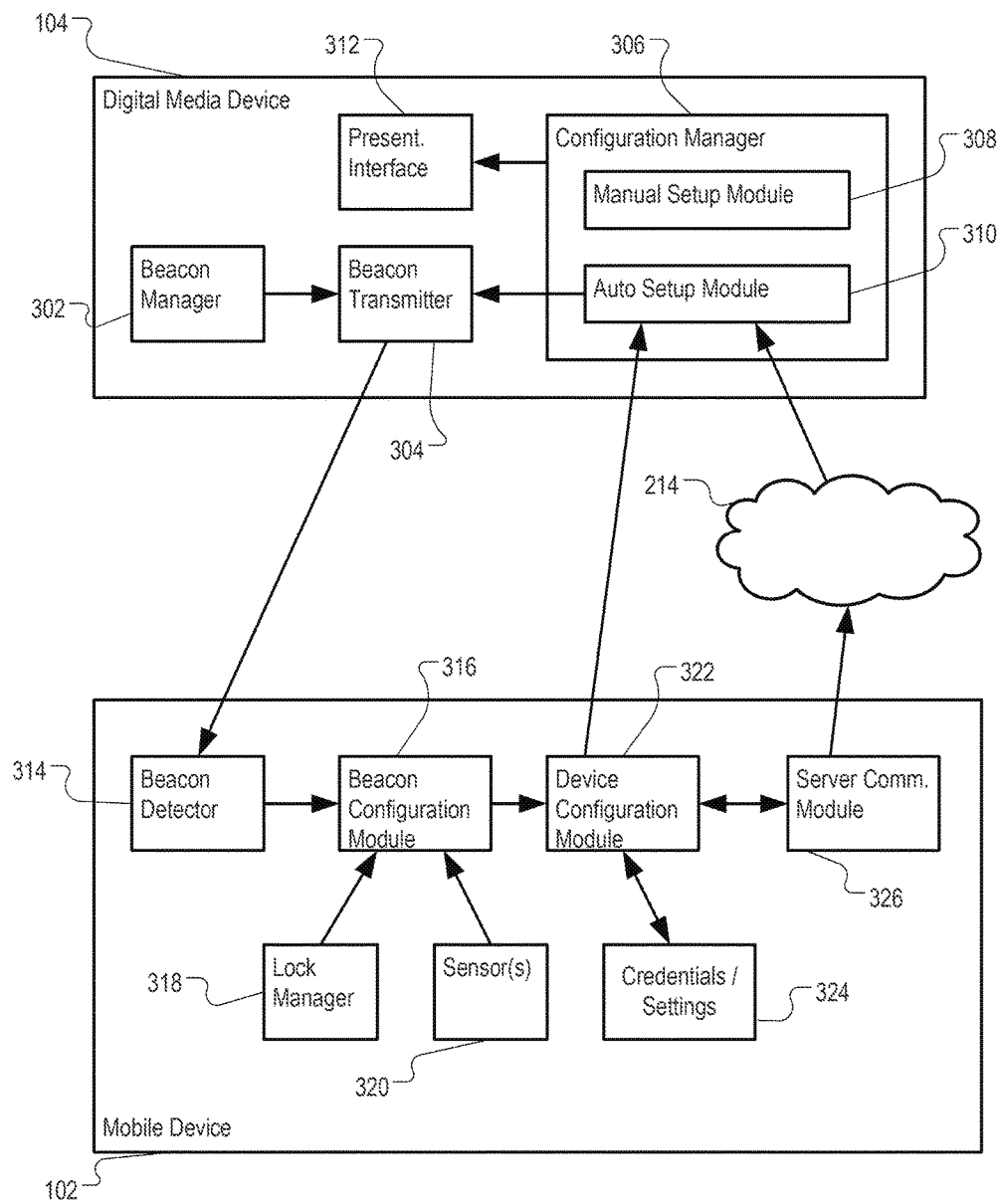
FIG. 3 is a block diagram illustrating components of an exemplary mobile device and an exemplary digital media device.

FIG. 3 is a block diagram illustrating components of exemplary mobile device 102 and exemplary digital media device 104. Each component of mobile device 102 and digital media device 104 can include hardware and software components.

Digital media device 104 can include beacon manager 302. Beacon manager 302 is a component of digital media device 104 configured to trigger a beacon broadcast based on one or more pre-specified conditions. The conditions can include, for example, when digital media device 104 displays a password entry field, such that each password entry requirement by digital media device 104 allows a user to enter the password by transmitting the password to digital media device 104 from mobile device 102. Additionally or alternatively, the condition can include a first-time power up of digital media device 104, a reset of digital media device 104 initiated by a user, or a change of environment of digital media device 104 (e.g., when digital media device 104 detects a new wireless network). Beacon manager 302 can detect an event satisfying a pre-specified condition. Upon detection of the event, beacon manager 302 can request beacon transmitter 304 to broadcast a configuration request beacon signal (e.g., beacon signal 202 of FIG. 2). In some implementations, beacon manager 302 can request beacon transmitter 304 to broadcast the configuration request beacon signal periodically and frequently (e.g., every N seconds), such that mobile device 102 can control digital media device 104 any time.

Beacon transmitter 304 is a component of digital media device 104 configured to encode device identification information and device type information as a payload of the configuration request beacon signal and broadcast the configuration request beacon signal for a pre-specified time period. After the time expires, beacon transmitter 304 can stop broadcasting the configuration beacon signal until requested to broadcast again by beacon manager 302.

Digital media device 104 can include configuration manager 306 configured to assign values to various parameters of digital media device 104. Configuration manager 306 can include manual setup module 308 and automatic setup module 310. Manual setup module 308 is a component of configuration manager 306 that, after a given period of time has expired since beacon transmitter 304 started broadcasting the configuration request beacon signal, causes configuration manager 306 to enter manual setup mode, if no configuration information is received wirelessly. In manual setup mode, configuration manager 306 can present parameters with empty values or default values as visual or audio prompts to presentation interface 312. Presentation interface 312 can be a component of digital media device 104 configured to interface with a presentation device to display or play the visual or audio prompts. The presentation device can be an audio system connected to digital media device 104 or a display device (e.g., display device 106 of FIG. 1).

If digital media device 104 receives configuration information during the given period since beacon transmitter 304 started broadcasting the configuration request beacon signal, automatic setup module 310 can stop beacon transmitter 304 from additional broadcasting and present parameters with values as provided in the configuration information as visual or audio prompts to presentation interface 312.

Mobile device 102 can include beacon detector 314. Beacon detector 314 can include a daemon executing on mobile device 102 and controlling a radio receiver to detect a configuration request beacon signal. When beacon detector 314 detects the beacon signal, beacon detector 314 can activate beacon configuration module 316.

Beacon configuration module 316 is a component of mobile device 102 configured to determine whether automatic configuration of digital media device 104 shall proceed. Beacon configuration module 316 can allow the configuration to proceed when one or more conditions are satisfied. The conditions can include a proximity condition based on a threshold distance. Beacon configuration module 316 can include a proximity calculator to determine whether a distance between a location of mobile device 102 and digital media device 104 satisfies the threshold distance. The conditions can include a security condition. Mobile device 102 can include lock manager 318, which can be configured to request a user to enter a password. Lock manager 318 can authenticate the password. The security condition can include successful authentication of the password. The conditions can include confirmation condition, which can be detection of occurrences of one or more confirmation events by various sensors of mobile device 102.

Mobile device 102 can include one or more sensors 320 coupled to beacon configuration module 316. Sensors 320 can include an accelerometer configured to detect a tap of mobile device 102 on an object by measuring acceleration. Sensors 320 can include a gyroscope, which can detect a motion (e.g., a flipping) of mobile device 102 by measuring angular speed. Sensors 320 can include a magnetometer, which can measure a motion of mobile device 102 based on changes in intensity and direction of magnetic fields. Sensors 320 can include a microphone for receiving an audio signal including a speech command. When sensors 320 detects the user action, beacon configuration module 316 can determine whether the tap, the motion, or the audio signal matches a pre-specified pattern and has occurred within a threshold distance of digital media device 104. If a match is found, and the threshold distance is satisfied, beacon configuration module 316 can trigger device configuration module 322 to configure digital media device 104 automatically.

Device configuration module 322 is a component of mobile device 102 configured to determine configuration information and provide the configuration information to digital media device 104 in a secure communication channel. Device configuration module 322 can determine the configuration information from credential store 324. Credential store 324 is a component of mobile device 102 storing user credentials and settings. The user credentials can include user identifiers and passwords of a WLAN to which mobile device 102 and digital media device 104 can be connected, and account information including user identifiers and passwords of a remote service accessible through communications network 214. The settings can include user preferences, e.g., sharing options, language settings, time zone settings, or display settings.

In some implementations, device configuration module 322 can provide a device identifier in a configuration beacon received from digital media device 104 to server communication module 326. Server communication module 326 can provide the identifier to a server through communications network 214. The server can issue a token (e.g., setup token 220 of FIG. 2) to digital media device 104.

In some implementations, the server can send the token directly to automatic setup module 310 through communications network 214. In some implementations, the server can send the token to server communication module 326 of mobile device 102 through communications network 214. Upon receiving the token, server communication module 326 of mobile device 102 can provide the token to device configuration module 322. Device configuration module 322 can then send the token to digital media device 104 through a secure communication channel. Automatic setup module 310 of digital media device 104, upon receiving the configuration information and the token, can use the configuration information and the token to configure parameters of digital media device 104.

In some implementations, device configuration module 322 can provide the device identifier in a configuration beacon received from digital media device 104 to credential store 324 for storage. Device configuration module 322 can determine that, after beacon configuration module 316 confirms that one or more conditions are satisfied, mobile device 102 can be used as a remote control of digital media device 104. Device configuration module 322 can create a long term pairing by storing the device identifier of digital media device 104. After the long term pairing has been created, device configuration module 322 can launch an application program for controlling various functions (e.g., volume, channel selection, or pause/resume) of digital media device 104. Some examples of controlling digital media device 104 using mobile device 102 are described below in reference to FIGS. 4-6.

Exemplary Device Control

Figure 4:
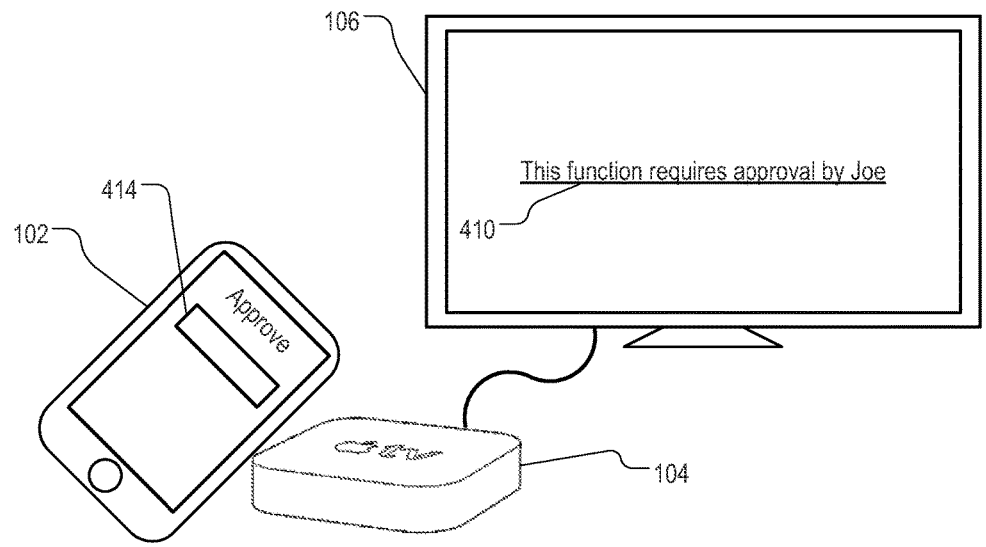
FIG. 4 is a diagram illustrating an exemplary implementation of controlling a function of a digital media device using a mobile device.

FIG. 4 is a diagram illustrating an exemplary implementation of controlling a function of digital media device 104 using a mobile device 102. Digital media device 104 can have a category of one or more functions that require approval before execution. For example, digital media device 104 can have functions to play pay-per-view content, to add paid channels, or to purchase additional programs (e.g., games) online. When digital media device 104 detects an attempt to activate a function that requires approval, digital media device 104 can present prompt 410 to a user to inform the user that the function requires approval. Prompt 410 can be a message displayed on display device 106. In addition, digital media device 104 can start broadcasting a beacon signal.

Mobile device 102 can detect the beacon signal and then, if mobile device 102 determines that a trigger condition has been satisfied, acts as a master key to approve execution of the function by digital media device 104. Mobile device 102 can determine that the trigger condition has been satisfied when a distance between a location of mobile device 102 and digital media device 104 satisfies a threshold distance. Mobile device 102 can determine that the trigger condition has been satisfied when mobile device 102 detects that mobile device 102 has tapped on digital media device 104 or an object located within the threshold distance of digital media device 104. Other conditions as described in reference to FIG. 3 can be used as the trigger condition.

Acting as the master key, mobile device 102 can request a password and then, upon authentication of the password, present user interface item 414. User interface item 414 can include, for example, a virtual button or a voice prompt for approving activation of the function on digital media device 104.

Upon receiving an approval input through user interface item 414, mobile device 102 can send approval through a secure communication channel between mobile device 102 and digital media device 104. Upon receiving the approval, digital media device 104 can activate the function.

Figure 5:
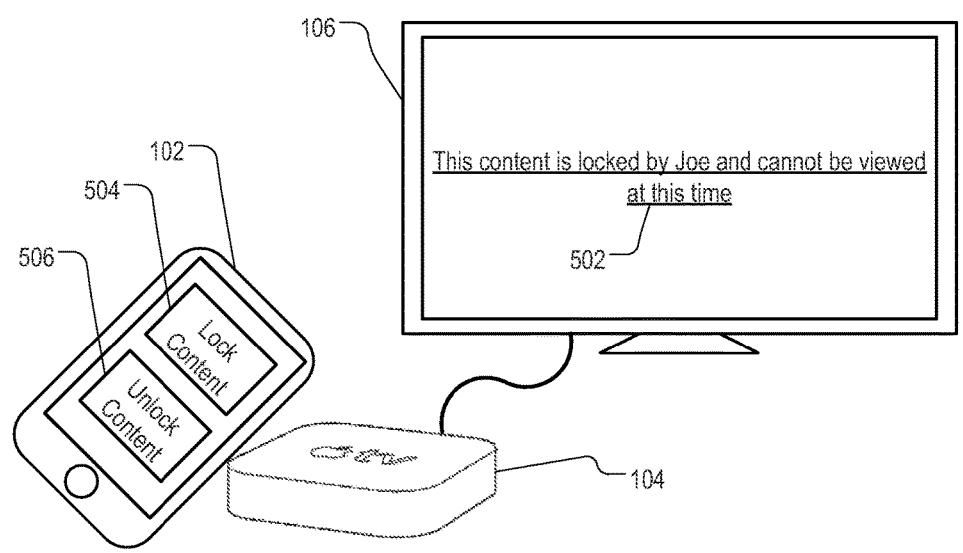
FIG. 5 is a diagram illustrating an exemplary implementation of controlling content on a digital media device using a mobile device.

FIG. 5 is a diagram illustrating an exemplary implementation of controlling content on digital media device 104 using mobile device 102. Digital media device 104 can have a content filtering function that allows some media content (e.g., certain movies or games) to be played only with permission by a particular user (e.g., permission by a user having parental administrative rights). When digital media device 104 detects an attempt to play the content that requires approval, digital media device 104 can present prompt 502 to a user. Prompt 502 can be a message displayed on display device 106 indicating that the content is locked and cannot be presented except if the particular user provides permission. In addition, digital media device 104 can start broadcasting a beacon signal indicating that permission to access content is requested.

Mobile device 102 can act as a master key to unlock the content when mobile device determines that a trigger condition has been satisfied. Mobile device 102 can request a password and then, upon authentication of the password, present user interface items 504 and 506. User interface items 504 and 506 can include, for example, virtual buttons or voice prompts for locking and unlocking the content on digital media device 104.

Upon receiving, through user interface items 504 or 506, an input for locking or unlocking the content, mobile device 102 can send instructions to lock or unlock the content through a secure communication channel between mobile device 102 and digital media device 104. Upon receiving the instructions, digital media device 104 can deny or approve a request to view the content.

Figure 6:
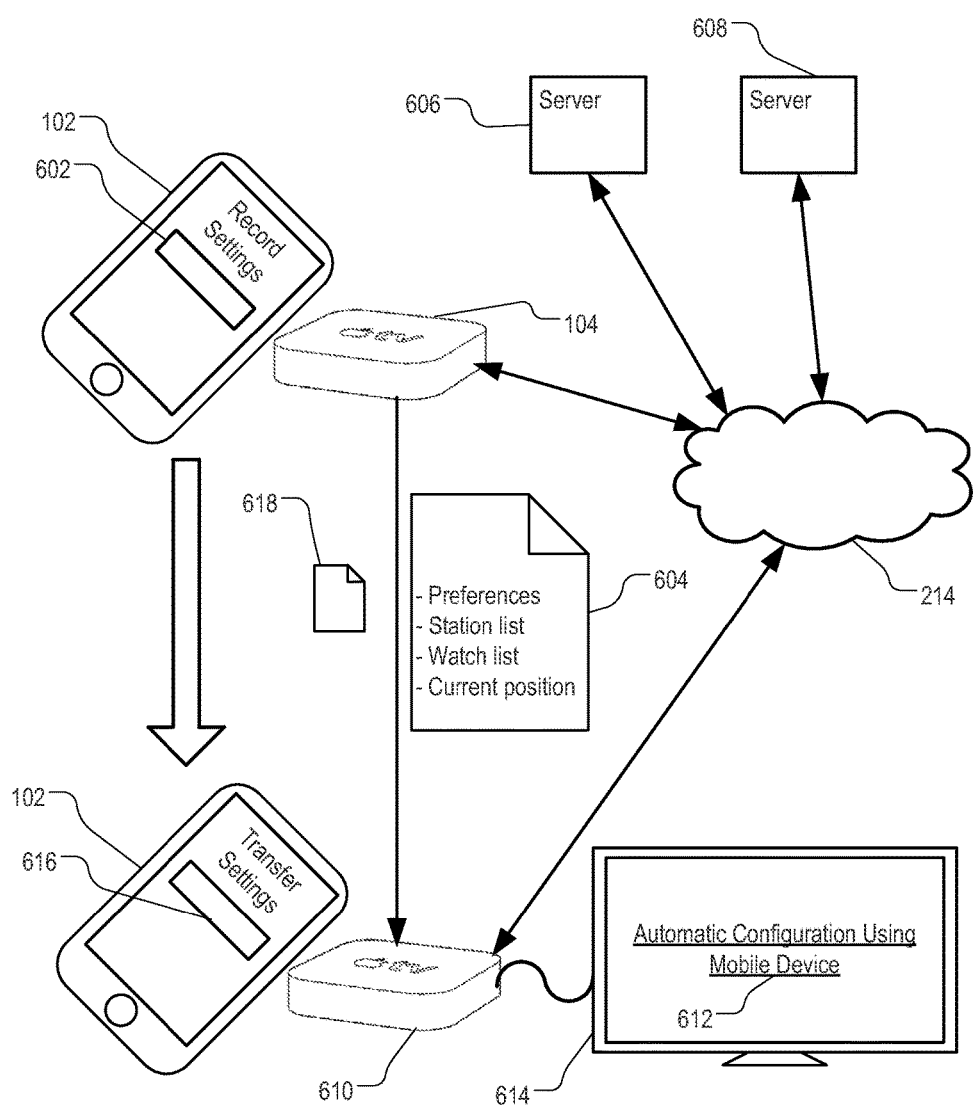
FIG. 6 is a diagram illustrating an exemplary implementation of transferring settings from one digital media device to another digital media device.

FIG. 6 is a diagram illustrating an exemplary implementation of transferring settings from one digital media device to another digital media device. Mobile device 102 and digital media device 104 can be paired together by an event in which mobile device 102 automatically configured digital media device 104. An application program that harvests settings of digital media device 104 can be activated on mobile device 102 when a trigger condition has been satisfied (e.g., when mobile device 102 taps digital media device 104). Once activated, and when a password is authenticated by both mobile device 102 and digital media device 104, the application program can cause mobile device 102 to provide for display user interface item 602 for recording settings 604 of digital media device 104. Upon receiving a user input through user interface item 602, the application program can record settings 604 of digital media device 104 through a secure communication channel when the trigger condition is satisfied.

Settings 604 can be different from the original settings of digital media device 104 as provided by mobile device 102 through configuration. For example, settings 604 can include display settings of a new operating system of digital media device 104, a list of new stations subscribed from server 606 through communications network 214 by digital media device 104 after the original configuration, a list of new online stores hosted by server 608 where a user created accounts on digital media device 104, or current position of paused music, movies, or games. Settings 604 can be stored on mobile device 102 after the application program receives and records settings 604 from digital media device 104.

Mobile device 102 can act like a "settings wallet" carrying settings 604 and moving to a new location close to digital media device 610. Digital media device 610 can be a device being configured the first time, or a device that has been configured before. In the latter case, digital media device 610 can provide prompt 612 for display on display device 614 that is connected to digital media device 610. Prompt 612 can indicate that, upon user approval, digital media device 610 can be configured by mobile device 102. Digital media device 610 can broadcast a beacon signal.

Upon detecting the beacon signal, mobile device 102 can configure digital media device 610 using recorded settings 604 when a trigger condition is satisfied (e.g., when a proximity threshold distance is satisfied or when a tap of mobile device 102 is detected). When the trigger condition is satisfied, and a password is authenticated, mobile device 102 can provide for display user interface item 616. User interface item 616 can include a virtual button configured to receive a user input for transferring settings 604 to digital media device 610. Upon receiving the user input, mobile device 102 can automatically configure digital media device 610 using settings 604 by sending settings 604 to digital media device 610 through a secure communication channel. After the automatic configuration, digital media device 610 can have the same settings as the settings of digital media device 104.

In some implementations, settings 604 can be stored at a server, e.g., server 606. Mobile device 102 can store key 618 that gives a digital media device 610 access right to settings 604 stored on server 606. Key 618 can include a token or an account name and password. Upon receiving the user input, mobile device 102 can automatically configure digital media device 610 by providing key 618 to digital media device 610. Mobile device 610 can then use key 618 to retrieve settings 604 from server 606.

Exemplary Procedures

Figure 7A:
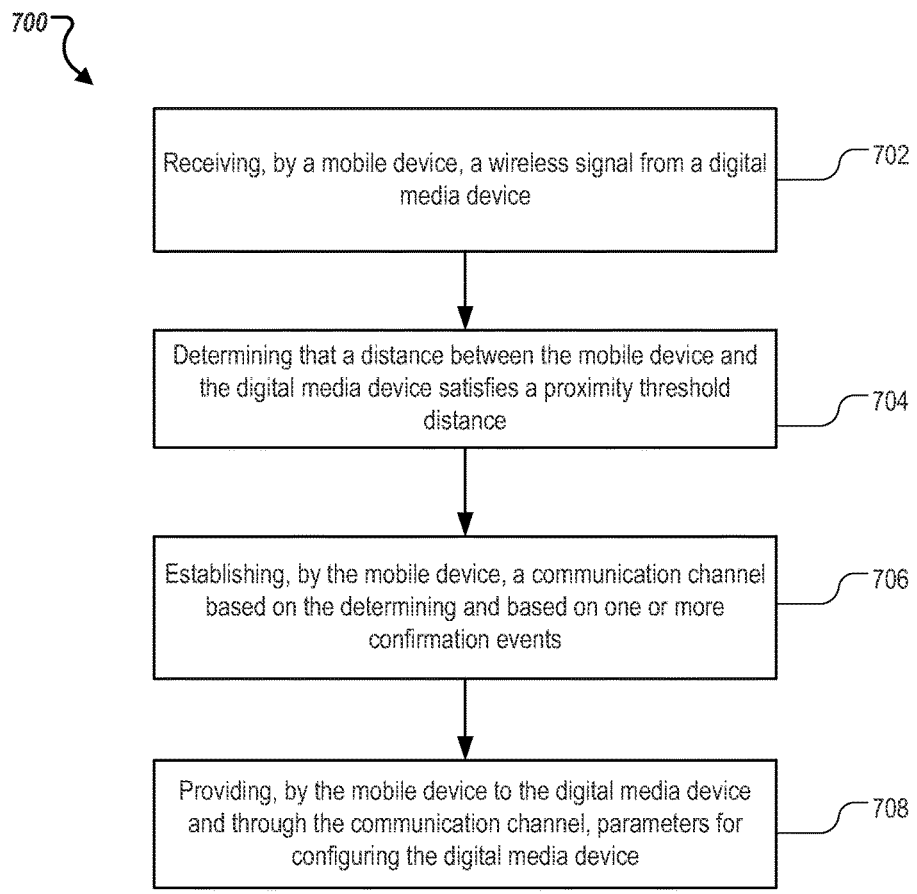
FIG. 7A is a flowchart illustrating an exemplary procedure of automatically controlling a media device using a mobile device.

FIG. 7A is a flowchart illustrating exemplary procedure 700 of automatically controlling digital media device 104 using a mobile device 102.

Mobile device 102 can receive (702) a wireless signal from digital media device 104. Digital media device 104 can be an electronic device configured to download, from a server and through a communications network, media content including video content for display on a television device, audio content for playing on an audio device, or online or standalone electronic games for executing on a computing device (e.g., a game console).

The wireless signal can be a beacon signal indicating that digital media device 104 requests configuration information. The beacon signal can include an identifier of digital media device 104. The beacon signal can include a signal conforming to a protocol for a personal area network. The protocol can be different from a protocol of the communications network for downloading the media content.

Mobile device 102 can determine (704), based on the wireless signal, that a distance between mobile device 102 and digital media device 104 satisfies a proximity threshold distance. The proximity threshold distance can be a pre-specified distance (e.g., no more than 30 inches) that is less than a maximum distance at which the wireless signal from digital media device is detectable by mobile device 102.

Mobile device 102 can establish (706) a communication channel based on determination that the proximity threshold distance is satisfied and based on one or more confirmation events indicating that the communication channel, when created between the mobile device and the digital media device, is secure. The confirmation events can include an authentication of a user's password received through a password input. The confirmation events can include a tap event where mobile device 102 taps on digital media device 104 or an object located within the proximity threshold distance to digital media device 104. Mobile device 102 can detect the tap event when an accelerometer reading of mobile device 102 matches a pre-specified pattern (e.g., when the reading is above a given lower limit and above a given upper limit). The confirmation events can include a signature gesture input received by mobile device 102 (e.g., when a gyroscope of mobile device 102 detects a flipping motion of mobile device 102 based on angular speed changes). The confirmation events can include a signature sound input received by mobile device 102 (e.g., when a microphone of mobile device 102 detects a whistling sound in a given frequency range or a speech command).

Mobile device 102 can then provide (708), to digital media device 104 and through the communication channel, parameters for configuring digital media device 104. The parameters can include credentials for receiving, from a server, media content accessible by mobile device 102. The credentials can include a password to access a wireless portion of the communications network, an account name and a password to access the media content on the server, a token for authenticating the digital media device at the server, or combinations of the above. The token can be received by mobile device 102 from the server. The parameters can include user preference information for configuring digital media device 104. The user preference information can include at least one of a content sharing setting of mobile device 102 or a language setting of mobile device 102.

In some implementations, when mobile device 102 receives the wireless signal, digital media device 104 can include previously stored parameters. The previously stored parameters can include user preferences or credentials manually entered on digital media device 104. The previously stored parameters can include at least one of a user selection of media content on a server or a user selection of servers through a communications network. Mobile device 102 can record a status of digital media device 104. The status can include the previously stored parameters of digital media device 104. Mobile device 102 can automatically configure another digital media device using the recorded status.

Figure 7B:
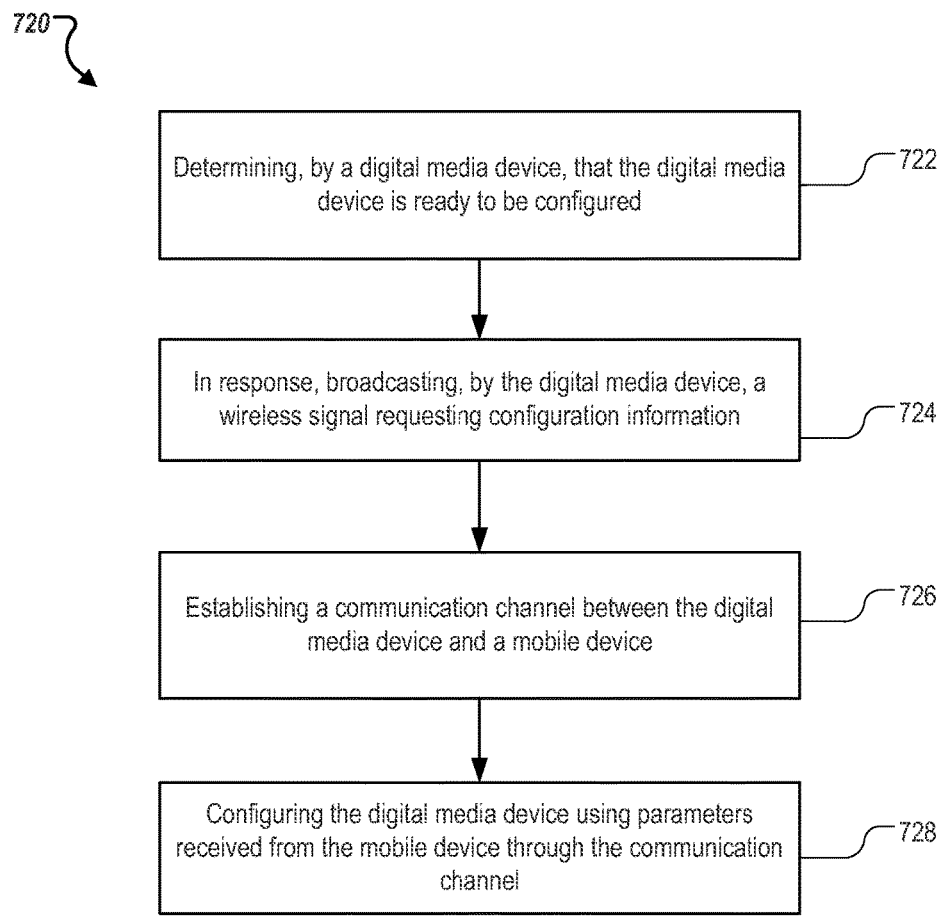
FIG. 7B is a flowchart illustrating an exemplary procedure of a digital media device automatically requesting configuration.

FIG. 7B is a flowchart illustrating exemplary procedure 720 of digital media device 104 automatically requesting configuration. Digital media device 104 can determine (722) that digital media device 104 is ready to be configured. Determining that digital media device 104 is ready to be configured can include determining that digital media device 104 is powered up the first time, is reset, or has received a request (e.g., from a remote control) for reconfiguration.

Digital media device 104 can broadcast (724) a wireless signal requesting configuration information. The wireless signal can be beacon signal 202. The wireless signal can include a payload indicating a type or model of digital media device 104.

Digital media device 104 can establish (726) a communication channel between digital media device 104 and a mobile device (e.g., mobile device 102) located within a proximity threshold distance from the digital media device. The proximity threshold distance can be less than a maximum distance at which the wireless signal from digital media device 104 is detectable by mobile device 102.

Digital media device 104 can configure (728) digital media device 104 using parameters received from mobile device 102 through the communication channel. The parameters can include user preference information for configuring digital media device 102. The user preference information can include at least one of a content sharing setting of mobile device 102 or a language setting of mobile device 102.

In some implementations, digital media device 104 can provide previously stored parameters to mobile device 102 through the communication channel. The previously stored parameters can include at least one of a user selection of media content on a server or a user selection of servers through a communications network.

Exemplary Mobile Device Architecture

Figure 8:
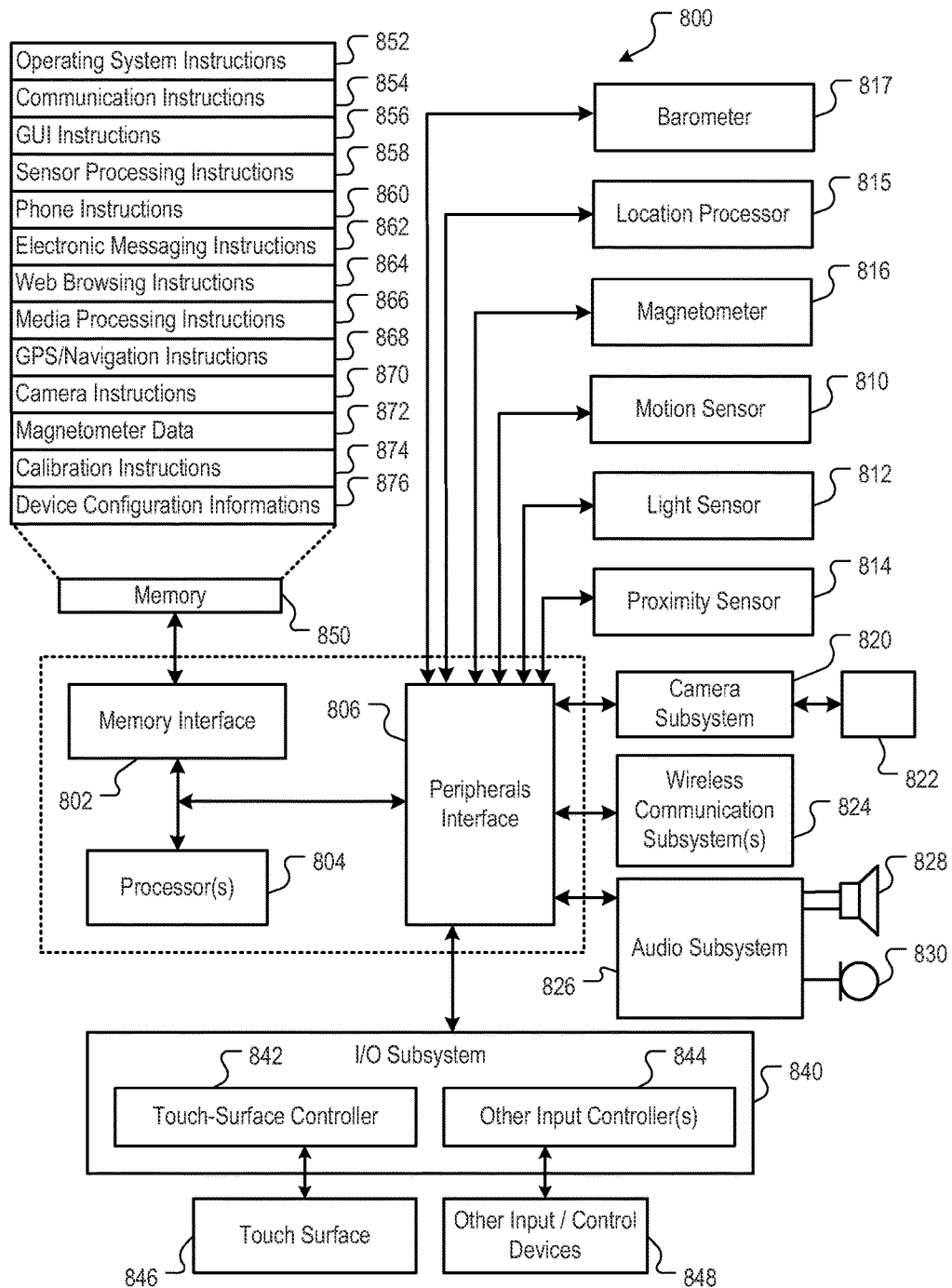
FIG. 8 is a block diagram illustrating an exemplary device architecture of a mobile device implementing the features and operations of FIGS. 1-7.

FIG. 8 is a block diagram illustrating exemplary device architecture 800 of a mobile device implementing the disclosed features and operations. A mobile device (e.g., mobile device 102) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in mobile device 102, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMAX™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to mobile device 102 on or off. The user may be able to customize a functionality of one or more of the buttons. The touch surface 846 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, iOS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store device configurations instructions 876 that, when executed, can cause processor 804 to perform operations of detecting beacon broadcast from a digital media device, determining a distance between mobile device 102 and the digital media device, detecting one or more confirmation events (e.g., a tapping event), providing configuration information to the digital media device, controlling functions or content of the digital media device, and porting configuration information from one digital media device to another digital media device.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
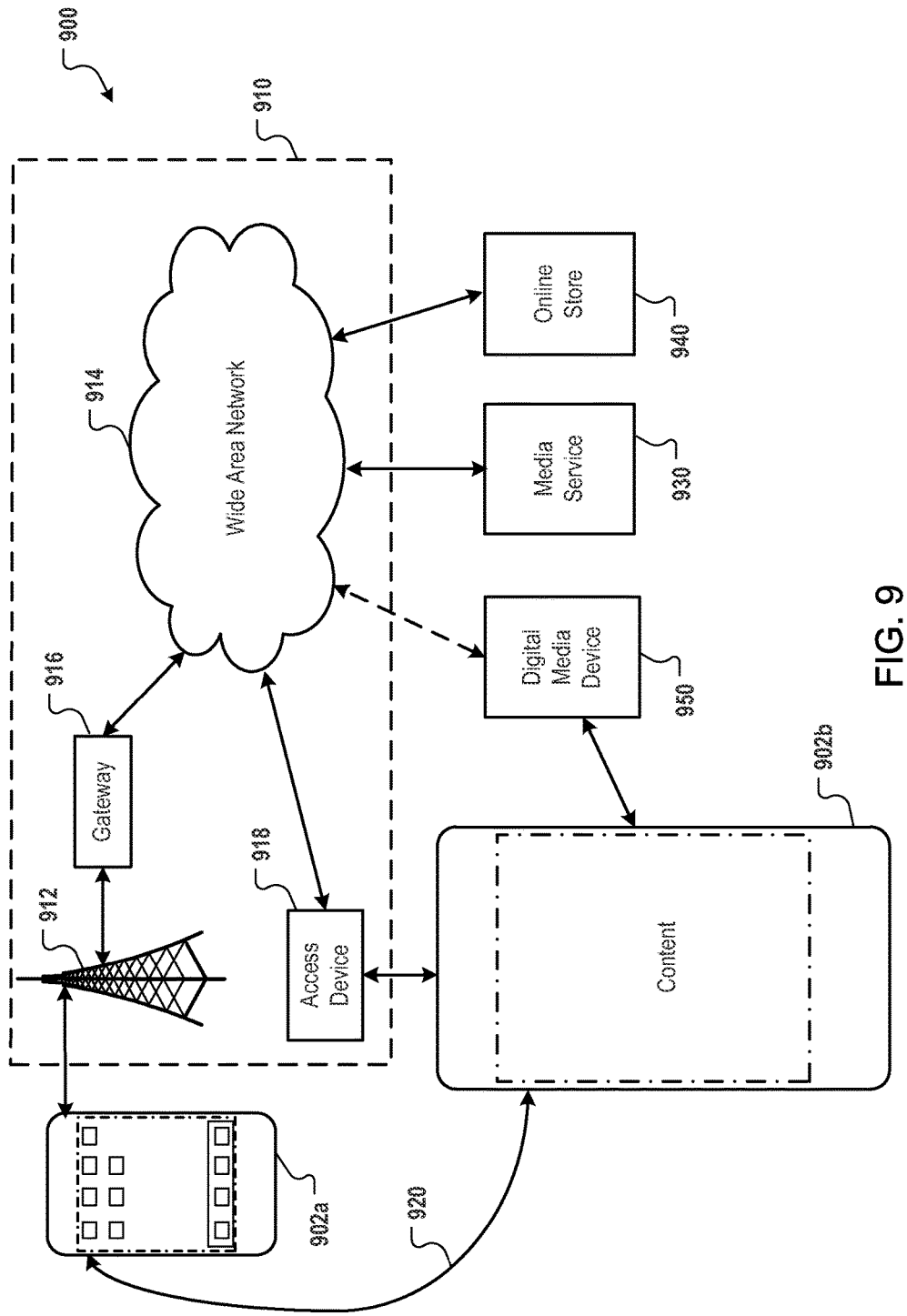
FIG. 9 is a block diagram of an exemplary network operating environment for the mobile devices implementing the features and operations of FIGS. 1-7.

FIG. 9 is a block diagram of exemplary network operating environment 900 for the mobile devices implementing the features and operations of category-based geofence. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914. Each of mobile devices 902a and 902b can be mobile device 102.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

Mobile device 902a or 902b can, for example, communicate with one or more services 930 and 940 over the one or more wired and/or wireless networks. For example, one or more media services 930 can provide streaming services of audio or video content to mobile devices 902a and 902b. Online store 940 can provide applications (e.g., games, utility tools, or educational software) to mobile devices 902a and 902b.

Mobile device 902a or 902b can communicate with one or more media devices 950. Each of media devices 950 can be a digital media device (e.g., digital media device 104). Each of media devices 950 can communicate to other devices, including mobile device 902a or 902b, through wide area network 914, a local area network, or a personal area network. Each media devices 950, after automatic configuration by a mobile device, can receive content from media service 930 or online store 940.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

Exemplary System Architecture

Figure 10:
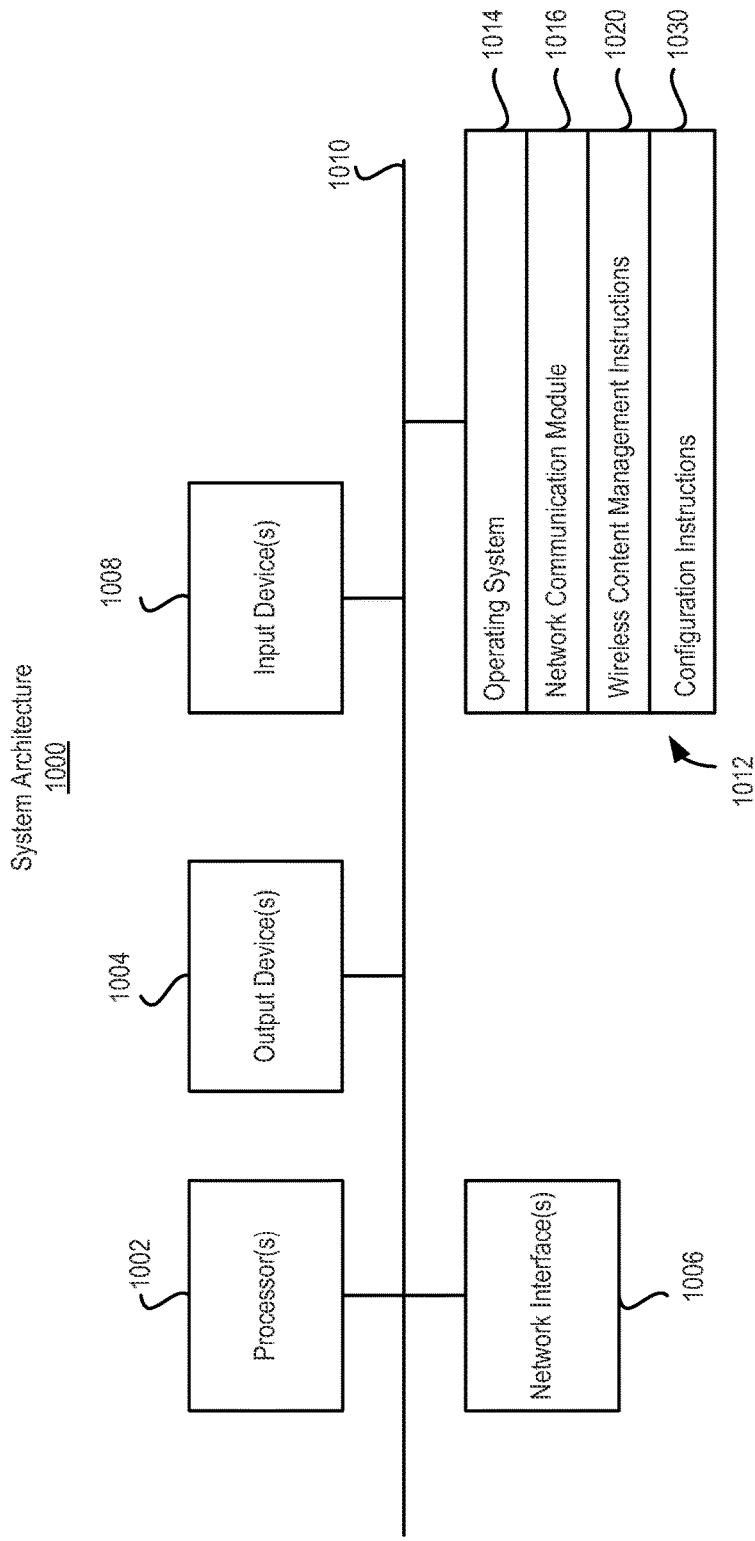
FIG. 10 is a block diagram of exemplary system architecture for implementing the features and operations of FIGS. 1-7.

FIG. 10 is a block diagram of exemplary system architecture 1000 for implementing the features and operations of FIG. 1-7. Other architectures are possible, including architectures with more or fewer components. System architecture 1000 can be an architecture for digital media device 104. In some implementations, architecture 1000 includes one or more processors 1002 (e.g., dual-core Intel® Xeon® Processors), one or more output devices 1004 (e.g., an interface to a LCD monitor), one or more network interfaces 1006, one or more input devices 1008 (e.g., interfaces for connecting to a mouse, keyboard, touch-sensitive display, or a remote control) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1012 can further include operating system 1014 (e.g., Mac OS® server, Windows Server®, UNIX®, Linux®, or iOS®), network communication module 1016, wireless content management instructions 1020 and configuration instructions 1030. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Wireless content management instructions 1020 can include computer instructions that, when executed, cause processor 1002 to perform operations of managing a user's accounts at various online content providers. Configurations instructions 1030 can include computer instructions that, when executed, cause processor 1002 to perform operations automatically configuring digital media device 104, including procedure 720 as described above in reference to FIG. 7B.

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, a PAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method comprising:
   receiving, by a mobile device, a wireless signal from a digital media device;
   determining, by the mobile device and based on the wireless signal, that a distance between the mobile device and the digital media device satisfies a proximity threshold distance, the proximity threshold distance being less than a maximum distance at which the wireless signal from the digital media device is detectable by the mobile device;
   establishing, by the mobile device, a communication channel based on the determining and based on one or more confirmation events indicating that a setup session between the mobile device and the digital media device has started or is about to start; and
   providing, by the mobile device to the digital media device through the communication channel during the setup session, parameters for automatically configuring the digital media device, at least one parameter of the parameters gathered from existing settings of the mobile device, the parameters including:
   a first name of a wireless network,
   a first password to access the wireless network,
   a second name associated with an account on an online content provider, and
   a second password associated with the account,
   wherein the parameters enable the digital media device to connect to the wireless network using the first name and the first password, and to access, through the wireless network, content associated with the account using the second name and the second password.

2. The method of claim 1, wherein:
   the digital media device is an electronic device configured to download, from a server and through a communications network that includes the wireless network, media content for displaying on a television device, playing on an audio device, or executing on a computing device.

3. The method of claim 2, wherein:
   the wireless signal comprises a signal conforming to a first protocol for a personal area network that is different from a second protocol of the communications network and the wireless network,
   the first name of the wireless network and the first password to access the wireless network are provided through the personal area network, and
   the second name and the second password are provided through the wireless network.

4. The method of claim 1, wherein the one or more confirmation events comprise a tap event that includes a tapping by the mobile device on the digital media device or an object located within the proximity threshold distance to the digital media device.

5. The method of claim 1, wherein:
   the one or more confirmation events comprise a signature sound input.

6. The method of claim 1, wherein the parameters include a token for authenticating the digital media device at a server of the online content provider, the token being received by the mobile device from the server.

7. The method of claim 1, wherein the parameters comprise user preference information for configuring the digital media device, the user preference information including at least one of a content sharing setting of the mobile device or a language setting of the mobile device.

8. The method of claim 1, wherein, at time the mobile device receives the wireless signal, the digital media device already stores previous parameters.

9. The method of claim 8, comprising:
recording, by the mobile device, a status of the digital media device, the status including the parameters of the digital media device; and
configuring, by the mobile device, a second digital media device according to the recorded status.

10. The method of claim 8, wherein the parameters include at least one of a user selection of media content on a server or a user selection of servers through a communications network.

11. A system comprising:
a mobile device; and
a storage device coupled to the mobile device, the storage device storing instructions operable to cause the mobile device to perform operations comprising:
receiving a wireless signal from a digital media device;
determining, based on the wireless signal, that a distance between the mobile device and the digital media device satisfies a proximity threshold distance, the proximity threshold distance being less than a maximum distance at which the wireless signal from the digital media device is detectable by the mobile device;
establishing a communication channel based on the determining and based on one or more confirmation events indicating that a setup session between the mobile device and the digital media device has started or is about to start; and
providing to the digital media device through the communication channel during the setup session, parameters for automatically configuring the digital media device, at least one parameter of the parameters gathered from existing settings of the mobile device, the parameters including:
a first name of a wireless network,
a first password to access the wireless network,
a second name associated with an account on an online content provider, and
a second password associated with the account,
wherein the parameters enable the digital media device to connect to the wireless network using the first name and the first password, and to access, through the wireless network, content associated with the account using the second name and the second password.

12. The system of claim 11, wherein:
the digital media device is an electronic device configured to download, from a server and through a communications network that includes the wireless network, media content for displaying on a television device, playing on an audio device, or executing on a computing device.

13. The system of claim 12, wherein:
the wireless signal comprises a signal conforming to a protocol for a personal area network that is different from a protocol of the communications network, and
the proximity threshold distance is less than or equal to 30 inches.

14. The system of claim 11, wherein the one or more confirmation events comprise a tap event that includes a tapping by the mobile device on the digital media device or an object located within the proximity threshold distance to the digital media device.

15. The system of claim 11, wherein:
the one or more confirmation events comprise a motion gesture.

16. The system of claim 11, wherein the parameters include a token for authenticating the digital media device at a server of the online content provider, the token being received by the mobile device from the server.

17. The system of claim 11, wherein the parameters comprise user preference information for configuring the digital media device, the user preference information including at least one of a content sharing setting of the mobile device or a language setting of the mobile device.

18. The system of claim 11, wherein, at time the mobile device receives the wireless signal, the digital media device already stores previous parameters.

19. The system of claim 18, the operations comprising:
recording, by the mobile device, a status of the digital media device, the status including the parameters of the digital media device; and
configuring, by the mobile device, a second digital media device according the recorded status.

20. The system of claim 18, wherein the previously stored parameters include at least one of a user selection of media content on a server or a user selection of servers through a communications network.

21. A non-transitory storage device storing instructions operable to cause a mobile device to perform operations comprising:
receiving a wireless signal from a digital media device;
determining based on the wireless signal, that a distance between the mobile device and the digital media device satisfies a proximity threshold distance, the proximity threshold distance being less than a maximum distance at which the wireless signal from the digital media device is detectable by the mobile device;
establishing a communication channel based on the determining and based on one or more confirmation events indicating that a setup session between the mobile device and the digital media device has started or is about to start; and
providing to the digital media device through the communication channel during the setup session, parameters for automatically configuring the digital media device, at least one parameter of the parameters gathered from existing settings of the mobile device, the parameters including:
a first name of a wireless network,
a first password to access the wireless network,
a second name associated with an account on an online content provider, and
a second password associated with the account,
wherein the parameters enable the digital media device to connect to the wireless network using the first name and the first password, and to access, through the wireless network, content associated with the account using the second name and the second password.

22. The non-transitory storage device of claim 21, wherein:
the digital media device is an electronic device configured to download, from a server and through a communications network that includes the wireless network, media content for displaying on a television device, playing on an audio device, or executing on a computing device.

23. The non-transitory storage device of claim 22, wherein:
the wireless signal comprises a signal conforming to a protocol for a personal area network that is different from a protocol of the communications network, and
the proximity threshold distance is less than or equal to 30 inches.

24. The non-transitory storage device of claim 21, wherein the one or more confirmation events comprise:
a tap event that includes a tapping by the mobile device on the digital media device or an object located within the proximity threshold distance to the digital media device.

25. The non-transitory storage device of claim 21, wherein:
the one or more confirmation events comprise a whistle sound or a speech command.

26. The non-transitory storage device of claim 21, wherein the parameters include a token for authenticating the digital media device at a server of the online content provider, the token being received by the mobile device from the server.

27. The non-transitory storage device of claim 21, wherein the parameters comprise user preference information for configuring the digital media device, the user preference information including at least one of a content sharing setting of the mobile device or a language setting of the mobile device.

28. The non-transitory storage device of claim 21, wherein, at time the mobile device receives the wireless signal, the digital media device already stores previous parameters.

29. The non-transitory storage device of claim 28, the operations comprising:
recording, by the mobile device, a status of the digital media device, the status including the parameters of the digital media device; and
configuring, by the mobile device, a second digital media device according the recorded status.

30. The non-transitory storage device of claim 28, wherein the previously stored parameters include at least one of a user selection of media content on a server or a user selection of servers through a communications network.

* * * * *